US010007130B2

(12) United States Patent
Hu et al.

(10) Patent No.: US 10,007,130 B2
(45) Date of Patent: Jun. 26, 2018

(54) MAGNETO-OPTIC SWITCH

(71) Applicant: Oplink Communications, LLC, Fremont, CA (US)

(72) Inventors: Yu Hu, Guangdong (CN); Zexiong Zhao, Guangdong (CN); Xiansheng Sun, Guangdong (CN); Binglong Qiu, Guangdong (CN); Senming Gong, Guangdong (CN)

(73) Assignee: Oplink Communications, LLC, Fremont, CA (US)

( * ) Notice: Subject to any disclaimer, the term of this patent is extended or adjusted under 35 U.S.C. 154(b) by 1 day.

(21) Appl. No.: 13/789,623

(22) Filed: Mar. 7, 2013

(65) Prior Publication Data

US 2014/0139918 A1 May 22, 2014

(30) Foreign Application Priority Data

Nov. 22, 2012 (CN) .......................... 2012 1 0480020

(51) Int. Cl.
*G02F 1/09* (2006.01)
*G02F 1/31* (2006.01)

(52) U.S. Cl.
CPC . *G02F 1/09* (2013.01); *G02F 1/31* (2013.01)

(58) Field of Classification Search
CPC .... G03H 2260/30; G02F 1/093; G02B 6/2746
USPC .... 359/483.01, 484.06, 484.01–484.03, 5–9; 369/103; 385/11; 362/19; 353/20; 398/43, 48, 65, 82
See application file for complete search history.

(56) References Cited

U.S. PATENT DOCUMENTS

| 5,848,203 | A | * | 12/1998 | Kawakami et al. ............ 385/11 |
| 2003/0048972 | A1 | * | 3/2003 | Lin et al. ........................ 385/11 |
| 2003/0068112 | A1 | * | 4/2003 | Jin ....................... G02B 5/3025 |
| | | | | 385/11 |

(Continued)

FOREIGN PATENT DOCUMENTS

CN          2896323 Y   *   5/2007

OTHER PUBLICATIONS

Chen et al, "Compacted 1x2 magnetic-optical switch", Chinese Pat. CN2896323Y, machine translation.*

(Continued)

*Primary Examiner* — Bumsuk Won
*Assistant Examiner* — Wen Huang
(74) *Attorney, Agent, or Firm* — Bo Huang

(57) ABSTRACT

Systems, methods, and apparatus for optical switching. In some implementations, a magneto-optic switch includes multiple optical components positioned in order along a light path including: a single fiber optical collimator, a first birefringent optic crystal, a first half wave plate assembly, a polarization rotation assembly, a second half wave plate assembly, a second birefringent optic crystal, and a dual fiber optic collimator, wherein a first side of the polarization rotation assembly near the first half wave plate assembly includes a first Faraday rotator element, a second side of the polarization rotation assembly near the second half wave plate assembly includes an optic rotation component, the polarization rotation assembly having a magnetic field generating component outside the first Faraday rotator element.

6 Claims, 5 Drawing Sheets

(56) References Cited

U.S. PATENT DOCUMENTS

2003/0161629 A1\* 8/2003 Frascolla ........... H04Q 11/0062
398/5
2005/0174917 A1\* 8/2005 Matsumoto et al. ......... 369/103

OTHER PUBLICATIONS

Chen et al, "Compact 1x2 Magneto-Optical Switch", Chinese Pat. CN2896323Y, official translation.\*

\* cited by examiner

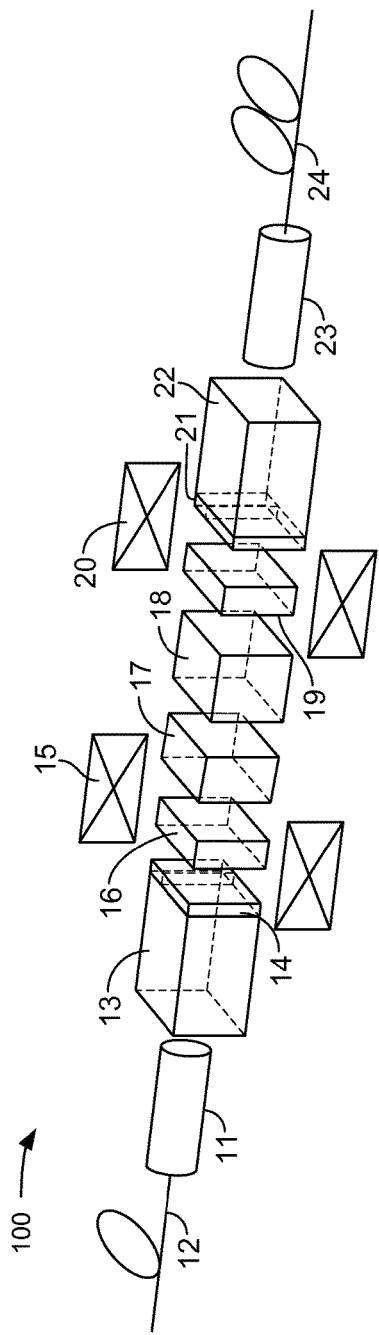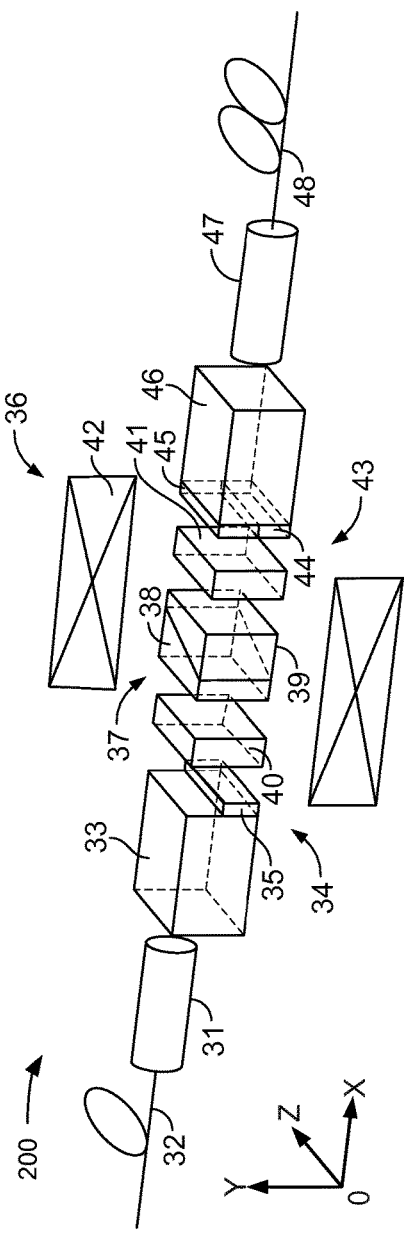
FIG. 1 (Prior Art)
FIG. 2

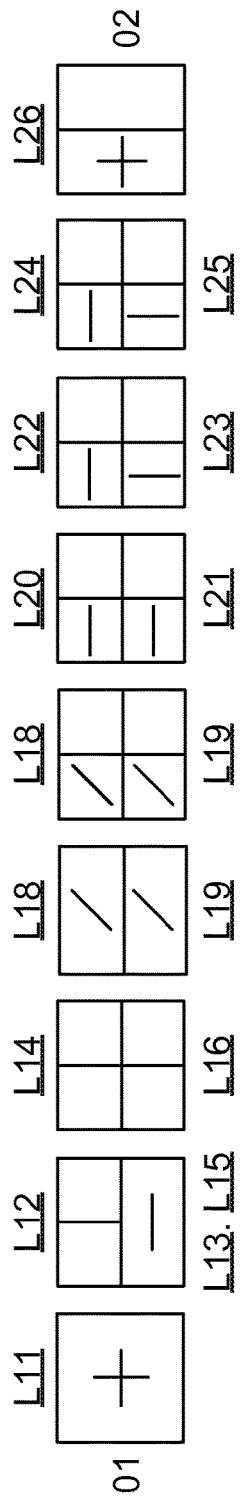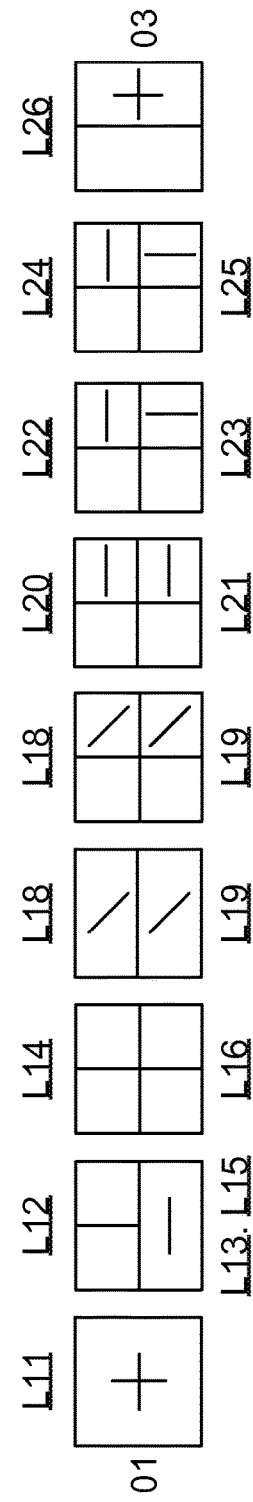

MAGNETO-OPTIC SWITCH

CROSS-REFERENCE TO RELATED APPLICATIONS

This application claims priority under 35 U.S.C. § 119 to Chinese patent application 201210480020.4, filed Nov. 22, 2012, the disclosure of which is incorporated herein by reference.

BACKGROUND

This specification relates to optical devices and more specifically to magneto-optic switches.

There are a large number of various types of optic switches, all aiming to achieve light beam switching between one input optical fiber and multiple output optical fibers or between multiple input optical fibers and one output optical fiber. Optic switches are typically used in the optical fiber communication industries, instrument industries, and defense industries.

Typical optic switches are primarily divided into mechanical optic switches and non-mechanical optic switches. Mechanical types of optic switch technologies have advantages including low production cost, broad bandwidth and low optical loss, etc. However, they also suffer from drawbacks including a large size, short life, poor repeatability, slow switching, etc. Advantages of non-mechanical optic switches include no moving part(s), high repeatability, high reliability, and fast switching, etc. A magneto-optical Switch is one type of non-mechanical optical switch. However, conventional non-mechanical optical switches have drawbacks including high optical insertion loss and high production cost due to their complex configuration and stringent optical alignment process.

FIG. 1 is a structural diagram of a conventional magneto-optic switch 100. An optical fiber 12 is installed in optical fiber collimator 11. Along a direction of a light path, the magneto-optic switch 100 includes a birefringent crystal 13, half wave plate assembly 14, Faraday rotator element 16, birefringent optic crystal plate 17, birefringent optic crystal light beam deflector 18, Faraday rotator element 19, half wave plate assembly 21, birefringent optic crystal 22, and dual fiber optical collimator 23 are positioned in sequence. Two parallel optical fibers 24 are installed in dual fiber optical collimator 23. Outside of Faraday rotator elements 16 and 19, magnetic field generating component 15 and 20 are separately positioned.

After a light beam is emitted from the optical fiber 12 of the single fiber optical collimator 11, it forms two light beams with identical directions of propagation after passing through the birefringent optic crystal 13. The polarization states of the two light beams are perpendicular to each other. After the two light beams pass through the half wave plate assembly 14, the directions of propagation remain unchanged, but the polarization states are identical. Furthermore, the two light beams pass through the Faraday rotator element 16, causing polarization states experience a rotation.

Particularly, when linear polarized light with a fixed polarization state passes through the Faraday rotator element 16, its polarization state rotates differently depending on a direction of the magnetic field. The birefringent optic crystal plate 17 and birefringent optic crystal light beam deflector 18 have different optical index of refraction for light beams with different polarization states. Thus, after light beams with different polarization states pass through birefringent optic crystal plate 17 and birefringent optic crystal light beam deflector 18, their directions of propagation will experience different changes. Using this characteristic, and by changing the direction of the current of the coil in magnetic field generating component 15, the magneto-optic switch changes the magnetic field polarity generated by the magnetic field generating component 15. This further changes the polarization states of light beams passing through the Faraday rotator element 16, and changes the directions of propagation of light beams after they pass through the birefringent optic crystal plate 17 and the birefringent optic crystal light beam deflector 18.

After light beams pass through the birefringent optic crystal plate 17 and the birefringent optic crystal light beam deflector 18, sequentially, they pass through the Faraday rotator element 19 and half wave plate assembly 21, before being emitted to the birefringent optic crystal 22. The two light beams that pass through the half wave plate assembly 21 merge into one beam inside the birefringent optic crystal 22, and then are emitted out of the optical fiber 24 inside the dual fiber optical collimator 23.

Because a change of the magnetic field polarity generated by the magnetic field generating component 15 can change the directions of propagation of light beams passing through the birefringent optic crystal plate 17 and the birefringent optic crystal light beam deflector 18, it is possible to select which optical fiber 24 inside the dual fiber optical collimator 23 the light beams will be directed toward, thus providing selection of a light path resulting in optical switching.

Additionally, the optical fibers installed in the single fiber optical collimator 11 and the optical fibers 12 and 24 installed in the dual fiber optical collimator 23 are ordinary standard optical fibers, thus the light beam being emitted from the optical fiber 12 has a large beam radius and a significant beam divergence, requiring the use of relatively bulky birefringent optic crystals 13 and 22. Thus, the Faraday rotator elements 16 and 19, birefringent optic crystal plate 17, and birefringent optic crystal light beam deflector 18 can all be relatively bulky. Additionally, it may be necessary to place certain clearances between the birefringent optic crystal plate 17 and the birefringent optic light beam deflector 18, making it difficult to reduce the sizes of the Faraday rotator elements 16 and 19, birefringent optic crystal plate 17, and birefringent optic crystal light beam deflector 18.

In addition, the magnetic field generating components 15 and 20 normally include a coil wound iron core, on which coils are wound. Because the Faraday rotator elements 16 and 19, birefringent optic crystal plate 17, and birefringent optic crystal light beam deflector 18 are relatively bulky, it can be difficult to place the components in the same iron core. The use of two magnetic field generating components 15 and 20 is typically required to respectively load magnetic fields into the Faraday rotator elements 16 and 19, leading to a higher number of components used by magneto-optic switches and bulkier components. This can raise the production cost of magneto-optic switches and increase the packaging difficulty.

SUMMARY

In general, one innovative aspect of the subject matter described in this specification can be embodied in a magneto-optic switch that includes multiple optical components positioned in order along a light path including: a single fiber optical collimator, a first birefringent optic crystal, a first half wave plate assembly, a polarization rotation assembly, a second half wave plate assembly, a second birefringent optic crystal, and a dual fiber optic collimator, wherein a first side of the polarization rotation assembly near the first half wave plate assembly includes a first Faraday rotator element, a second side of the polarization rotation assembly near the second half wave plate assembly includes an optic rotation element, the polarization rotation assembly having a magnetic field generating component outside the first Faraday rotator element.

The foregoing and other embodiments can each optionally include one or more of the following features, alone or in combination. The single fiber optical collimator is a single core expanded fiber optical collimator and wherein a core expanded optical fiber is installed in the single core expanded fiber optical collimator. The dual fiber optical collimator is a dual core expanded dual fiber optical collimator and wherein two core expanded optical fibers are installed in the dual core expanded fiber optical collimator. The first Faraday rotator element of the polarization rotation assembly, the refraction component, the optic rotation component, and the magnetic field generating component are integrally packaged. The optic rotation component is a second Faraday rotator element. The second Faraday rotator element is located inside the magnetic field generating component. The optic rotation component is a half wave plate. The refraction component is a Wollaston prism or a pair of mutually adjacent birefringent optic crystal wedges. The first half wave plate assembly has a first half wave plate, the first half wave plate being located on a light path of a light beam emitted from the first birefringent optic crystal. The second half wave plate assembly has a second half wave plate, the second half wave plate being located on a light path of a light beam emitted from the first birefringent optic crystal. The second half wave plate assembly includes a compensation plate, the compensation plate being located on the light path of another light beam where the second half wave plate is located. The first half wave plate assembly and the second half wave plate assembly, respectively, include two half wave plates, the two half wave plates in the same set of half wave plate assemblies are respectively located on the light paths of two light beams emitted from the first birefringent optic crystal.

Particular embodiments of the subject matter described in this specification can be implemented so as to realize one or more of the following advantages. A less bulky magneto-optic switch can be provided as compared to some conventional magneto-optic switches. Additionally, a magneto-optic switch is provided that uses fewer components. Because the size of the components in the polarization rotation assembly is smaller, it is possible to integrally package the components, forming an integrated module and simplifying the packaging process of magneto-optic switches, thus also improving the manufacturing efficiency of magneto-optic switches.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 is a structural diagram of a conventional magneto-optic switch.

FIG. 2 is an optic structural diagram of an example magneto-optic switch.

FIG. 6 is a diagram of the light beam polarization state progressive transformation of the magneto-optic switch of FIG. 2 under a first work state.

FIG. 7 is a diagram of the light beam polarization state progressive transformation of the magneto-optic switch of FIG. 2 under a second work state.

Like reference numbers and designations in the various drawings indicate like elements.

DETAILED DESCRIPTION

Figure 3:
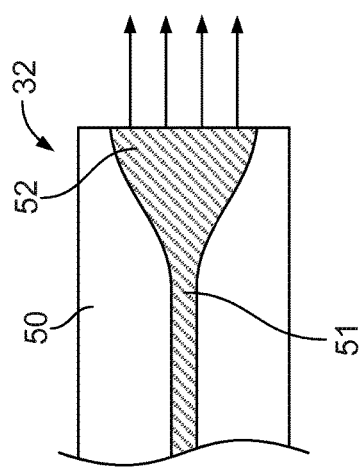
FIG. 3 is a structural diagram of an example expanded core optical fiber.

The magneto-optic switches disclosed in the present specification can achieve a light path switching between one input optical fiber and multiple output optical fibers as well as the light path switching between multiple input optical fibers and one output optical fiber.

FIG. 2 is an optic structural diagram of an example magneto-optic switch 200. The magneto-optic switch 200 includes a single fiber optical collimator 31. An optical fiber 32 is installed in the single fiber optical collimator 31. In some implementations, the single fiber optical collimator 31 includes a single expanded core fiber optical collimator and the optical fiber 32 is an expanded core optical fiber. On the emitting end of the single fiber optical collimator 31, along the direction of the light path, the magneto-optic switch 200 includes optical components including birefringent optic crystal 33, half wave plate assembly 34, polarization rotation assembly 36, half wave plate assembly 43, birefringent optic crystal 46, and dual fiber optic collimators 47 are positioned in order. Two parallel optical fibers 48 are installed in the dual fiber optical collimator 47. In some implementations, the dual fiber optic collimator 47 is a dual expanded core fiber optical collimator. In some implementations, the two optical fibers 48 are both expanded core optical fibers.

FIG. 3 is a structural diagram of an example expanded core optical fiber. An optical fiber 32 includes a fiber core 51 and a cladding layer 50 that is wrapped outside of fiber core 51. At a first end of the optical fiber 32, the radius of fiber core 51 expands gradually, forming an expanded area 52. As a result, the radius of a light beam emitted from the single expanded core optical fiber collimator 31 is reduced. The two optical fibers 48 installed in dual fiber optical collimator 47 are also core expanded fibers, whose structures are similar to the structure of optical fiber 32.

Returning to FIG. 2, the half wave plate assembly 34 includes a half wave plate 35. The half wave plate 35 is located on one of the light paths of the two light beams emitted from the birefringent optic crystal 33. The half wave plate 35 is located on a side of a lower end, as shown in FIG. 2, near the birefringent optic crystal 33. The half wave plate assembly 43 includes a half wave plate 44 and a compensation plate 45. The half wave plate 44 is located on the light path of the same light beam for the half wave plate 35. By contrast, the compensation plate 45 is located on the light path of the other light beam opposite the light beam for the half wave plate 44. The half wave plate 44 is located on a side near the lower end, as shown in FIG. 2, of the birefringent optic crystal 46, whereas the compensation plate 45 is located on a side near an upper end, as shown in FIG. 2, of the birefringent optic crystal 46.

The half wave plates 35 and 44 have a phase delaying function for light beams passing through them. After a light beam passes through the half wave plates 35 and 44, the phase will experience a delay, thus changing the polarization state of the light beam. After the light beam passes through the half wave plates 35 and 44, the phase delay is half of a phase. Consequently, the polarization state will experience a 90° rotation.

By setting optic axis angles of the half wave plates 35 and 44 and the angle of the polarization direction of linear polarized light emitted onto half wave plates 35 and 44, a 90° rotation of the polarization state of the half wave plates 35 and 44 for linear polarized light occurs. In some other implementations, the directions of the optic axes of half wave plates can be changed such that the rotation angle of the polarization direction of linear polarized light after passing through a half wave plate may not be 90°.

The compensation plate 45 has a phase delaying function for a light beam that passes through the compensation plate 45 corresponding to a phase delay of one phase. Therefore, the polarization state of the linear polarized light will not be changed. Of the two light beams emitted from the birefringent optic crystal 33, one light beam will pass through the half wave plates 35 and 44 such that its phase experiences a one phase delay. To ensure the phase synchronization of two light beams, another light beam passes through the compensation plate, to achieve a one phase delay, thus ensuring synchronization of the phases of the two light beams emitted onto the birefringent optic crystal 46.

The polarization rotation assembly 36 includes a refraction component. In some implementations, the refraction component is a Wollaston prism 37 that includes a pair of wedge prisms 38 and 39. The optic axes of the wedge prisms 38 and 39 are perpendicular to each other. On the two ends of Wollaston prism 37, Faraday rotator elements 40 and 41 are respectively positioned. The Faraday rotator element 40 is positioned on a side near the half wave plate assembly 34, and the Faraday rotator element 41 is positioned on a side near the half wave plate assembly 43.

Figure 4:
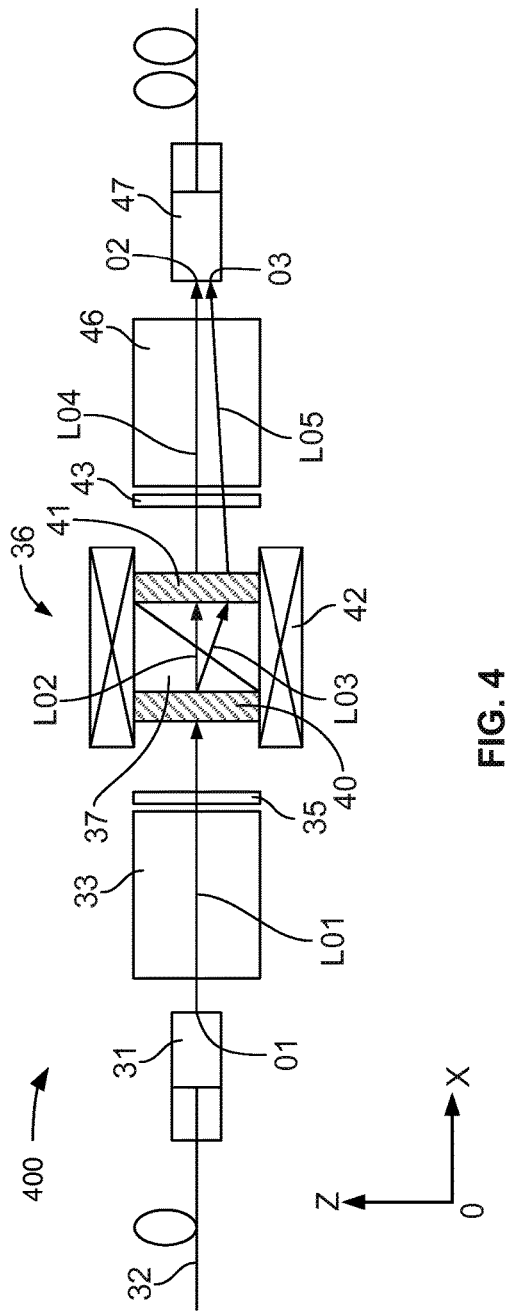
FIG. 4 is an optic structural top view of the magneto-optic switch of FIG. 2.

A magnetic field generating component 42 is positioned outside the Faraday rotator elements 40 and 41. The magnetic field generating component 42 includes a circular iron core. A coil is wound onto the circular iron core. Electrical currents selectively applied in different directions are passed through the coil to generate magnetic fields with different polarities on the iron core. In addition, the Wollaston prism 37 and Faraday rotator elements 40 and 41 are positioned inside the magnetic field generating component 42. In some implementations, the Wollaston prism 37, Faraday rotator elements 40 and 41, and magnetic fields generating component 42 are integrally packaged, forming an integrated module 400, as shown in FIG. 4. The Faraday rotator elements 40 and 41 are respectively positioned adjacent to two side walls of the Wollaston prism 37. The magnetic field generating component 42 is positioned outside of the Wollaston prism 37 and the Faraday rotator elements 40 and 41.

The single fiber optical collimator 31 is positioned on the optical input end of the magneto-optic switch 200, forming an optical input port. The dual fiber optical collimator 47 is located on the optical output end of the magneto-optic switch 200. The dual fiber optical collimator 47 holds two expanded core optical fibers 48 used for outputting light beams, and thereby forming a first and a second optical output ports. As illustrated in FIG. 4, the optical output ports have a specified separation distance on axis Z, that is, the first and second optical output ports do not overlap.

Figure 5:
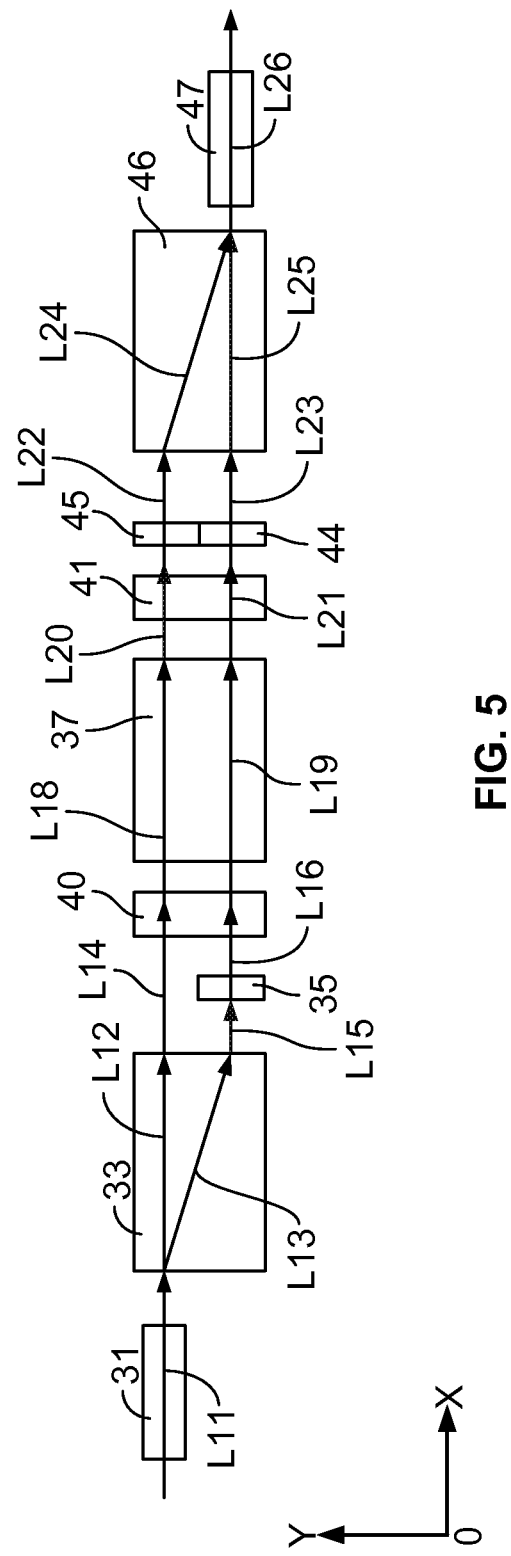
FIG. 5 is an optic structural main view of the magneto-optic switch of FIG. 2.

FIG. 5 is an optic structural main view of the magneto-optic switch of FIG. 2. FIG. 6 is a diagram of an example light beam polarization state progressive transformation of the magneto-optic switch of FIG. 2 under a first work state, e.g., when a current is applied to the magnetic field generating component 42 is a first direction. After light beam L11 with a random polarization state is emitted from the single fiber optical collimator 31, it enters the birefringent optic crystal 33 and is separated into two light beams, L12 and L13, whose polarization states are perpendicular to each other. The optic axis of the birefringent optic crystal 33 are within the X-Y plane and form a 45° angle from both X and Y axes. Light beam L12 formed by the decomposition is an extraordinary light, whose polarization direction runs parallel to axis Y, and is emitted from the side near the upper end of the birefringent optic crystal 33. Light beam L13 is an ordinary light, whose polarization direction runs parallel to axis X, and which is emitted from the side near the lower end of the birefringent optic crystal 33.

After the light beam L12 is emitted from the birefringent optic crystal 33, it forms light beam L14, and passes into the Faraday rotator element 40. After light beam L13 is emitted from the birefringent optic crystal 33, it forms light beam L15. The polarization state of light beam L15 is identical to the polarization state of light beam L13. It then passes into the half wave plate 35 and forms light beam L16. The polarization state of light beam L16 will experience a 90° rotation. Therefore, the polarization state of light beam L16 is identical to the polarization state of light beam L14, as both run parallel to axis Y.

On the X-Y plane, light beams L14 and L16 are two light beams distributed in the upper part and lower part, respectively. However, on the X-Z plane, light beam L14 overlaps with light beam L16 and are both located in positions on light beam L01, as shown in FIG. 4.

After light beam L14 and light beam L16 pass through the Faraday rotator element 40, they respectively form light beams L18 and L19. A current is applied to the coil of the magnetic field generating component 42 in a first direction. The polarization states of two light beams L18 and L19 experience a 45° rotation relative to the polarization states of light beams L14 and L16 and the direction of polarization is a 45° clockwise rotation in the Y-Z plane.

After light beams L18 and L19 are emitted into the Wollaston prism 37, their polarization states do not change, but there is a change from extraordinary light to ordinary light. At the same time, the direction of propagation of light will experience a deflection to the forward direction of axis Z in the X-Z plane, but the angle of the deflection is normally small. As shown in FIG. 4, light beams L20 and L21 will propagate along the direction of light path L02. After light beams L18 and L19 pass through the Wollaston prism 37, they respectively form light beams L20 and L21 and after light beams L20 and L21 pass through the Faraday rotator element 41, the polarization states will again experience a rotation by continuing to rotate clockwise by 45° in the Y-Z plane. Consequently, the polarization direction of light beams L20 and L21 run parallel to axis Z.

Then, light beam L20 passes through the compensation plate 45 and forms light beam L22 and the polarization state will not change. However, a delay of one phase occurs. When light beam L21 passes through the half wave plate 44 and forms the light beam L23. The polarization direction of the light beam L23 experiences a 90° rotation relative to polarization direction of light beam L21. As a result, the polarization direction of light beam L22 and the polarization direction of light beam L23 are perpendicular to each other.

After light beam L22 and light beam L23 are emitted into the birefringent optic crystal 46, they respectively form light beams L24 and L25 without change in polarization state. Light beams L24 and L25 are merged in the birefringent optic crystal 46 to form light beam L26, which is emitted into optical fiber 48 of the dual fiber optical collimator 47. In particular, the light beam L26 is emitted into a first optical output port. Additionally, light beams L24 and L25 will propagate in the direction of light path L04 shown in FIG. 4.

Thus, by passing a current through the magnetic field generating component 42 in the first direction, the light path of light from the optical input port passes to a first optical output port.

If a current is applied to the magnetic field generating component 42 in a second direction (i.e., a reverse direction), the polarity of the magnetic field generated by the magnetic field generating component 42 changes. Consequently, after light beams L14 and L16 are emitted into the Faraday rotator element 40, their polarization state rotates counterclockwise within the Y-Z plane by 45°. The resulting polarization direction of light beams L18 and L19 is shown in FIG. 7. However, on the X-Z plane, light beams L14 and L16 are still propagated along the direction of light path L01.

When a reverse current is applied to the magnetic field generation component 42, the polarization direction of light beams L18 and L19 is different from the polarization direction when the forward current is applied to the magnetic field generating component 42. Additionally, because the Wollaston prism 37 has a different refraction index for linear polarized light in different polarization states, their directions of propagation are also different. Therefore, light beams L18 and L19 will propagate along the direction of light beam L03 in the Wollaston prism 37 in FIG. 4. That is, light beams L18 and L19 will experience a change from ordinary light to extraordinary light and the directions of propagation will be deflected to the negative Z axis direction in the X-Z plane.

After light beams L18 and L19 are emitted from the Wollaston prism 37, they form light beams L20 and L21 and are emitted into the Faraday rotator element 41. The polarization directions of light beams L20 and L21 will experience another rotation compared to light beams L18 and L19. The polarization directions of light beams L20 and L21 both run parallel to the Z axis.

After light beam L20 passes through the half wave plate 44, whose optic axis is 45° in the Y-Z plane, the polarization direction will rotate by 90°. After light beam L21 passes through the compensation plate 45, the polarization direction remains unchanged, but undergoes a phase delay of one phase. Light beams L22 and L23, whose polarization states are perpendicular to each other, are merged after being emitted into the birefringent optic crystal 46 and propagated upward along the direction of light path L05 in FIG. 4. Light beam L26 formed after the merge is emitted into another core expanded optical fiber 48 of dual fiber optical collimators 47, thus achieving light path 03 from optical input port to the second optical output port.

Thus, by changing the directions of currents applied to the magnetic field generating component 42, the output ports of light beams can be changed to provide optic switching between output ports.

Since, the optical fiber 32 of the optical input end and the optical fiber 48 of the optical output end are both expanded core fibers, the radius of the light beam emitted from the single core expanded fiber optical collimator 31 is smaller. Therefore, the sizes of the birefringent optic crystals 33 and 46 and the components in polarization rotation assembly 36 can be compact in size. Consequently, two Faraday rotator elements 40 and 41 can be placed in the same magnetic field generating component 42, which not only reduces the size of the magneto-optic switch, but also reduces the number of components used by the magneto-optic switch.

In some implementations, the Faraday rotator element 41 can be replaced with a half wave plate. The half wave plate is used to rotate the polarization state of an incoming light beam by 45°. However, the crosstalk performance of the magneto-optic switch will be substantially reduced. This is because the magneto-optic switch cannot achieve the isolation of light beams back reflected from optical output ports. Therefore, they may only be used in situations where the requirement for crosstalk performance is not rigorous.

Figure 8:
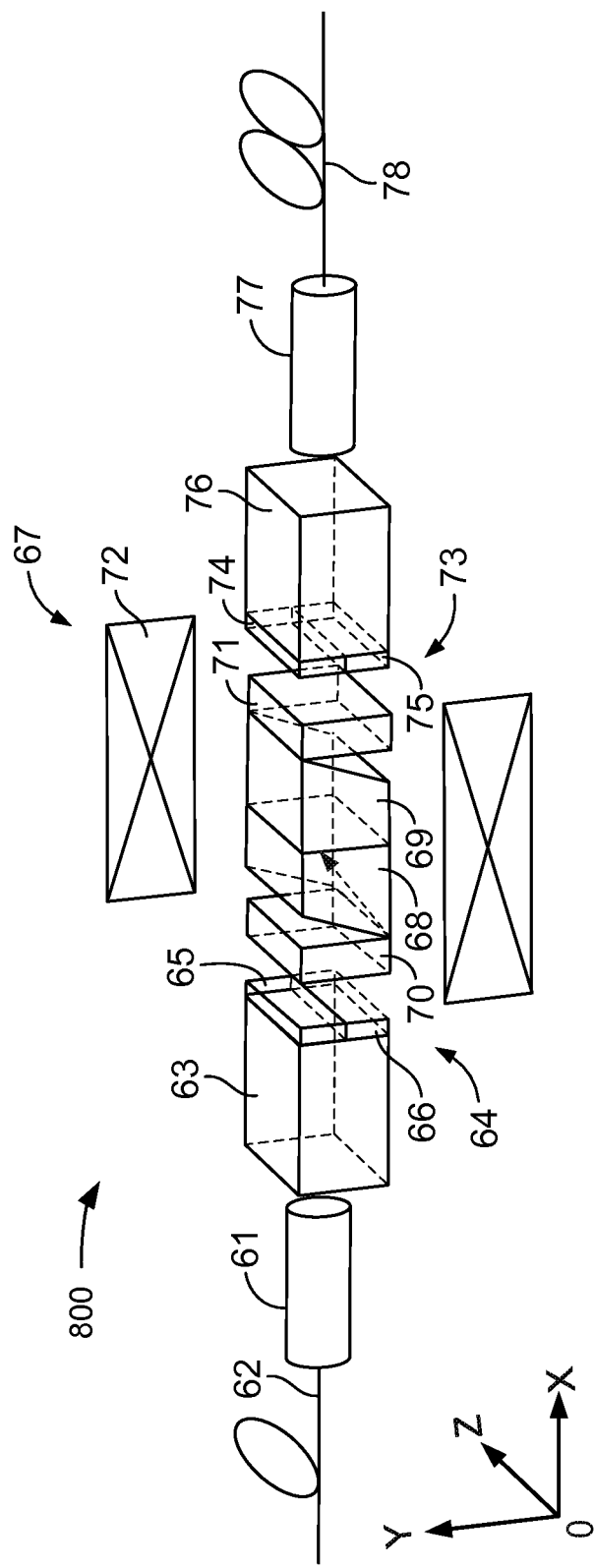
FIG. 8 is an optic structural diagram of another example magneto-optic switch.

FIG. 8 is an optic structural diagram of another example magneto-optic switch 800. The magneto-optic switch 800 includes a single fiber optical collimator 61. An optical fiber 62 is installed in the single fiber optical collimator 61. On the emitting end of the single fiber optical collimator 61, along the direction of a light path, optical components can include birefringent optic crystal 63, half wave plate assembly 64, polarization rotation assembly 67, half wave plate assembly 73, birefringent optic crystal 76, and dual fiber optical collimator 77 are positioned in order. Two parallel optical fibers 78 are installed in the dual fiber optical collimator 77.

The single fiber optical collimator 61 is a single core expanded fiber optical collimator. The dual fiber optical collimator 77 is a dual core expanded fiber optical collimator and optical fibers 62 and 78 are both core expanded optical fibers. Thus, the radius of the fiber optic cores near the end of the optical fibers increases gradually, so that the radius of the light spot of the light beam emitted from the optical fiber 62 is larger.

The half wave plate assembly 64 includes two half wave plates 65 and 66, which are respectively located on the light paths of two light beams emitted from the birefringent optic crystal 63. The function of the half wave plate assembly 64 is to change the polarization states of the two light beams from a mutually perpendicular state to a mutually parallel state. Therefore, the optic axes of the half wave plates 65 and 66 are not parallel.

The half wave plate assembly 73 also includes two half wave plates 74 and 75, which are also respectively located on the light paths of two different light beams. The function of the half wave plate 73 is to change the polarization states of the two incoming light beams from being parallel to each other to a state where the polarization states are perpendicular to each other. Therefore, the optic axes of the half wave plates 74 and 75 are not parallel.

The polarization rotation assembly 67 includes a refraction component. The refraction component includes two mutually adjacent birefringent optic crystal wedges 68 and 69 and the optic axes of the birefringent optic crystal 68 and the birefringent optic crystal 69 are perpendicular to each other. A Faraday rotator element 70 is positioned on a side of the refraction component proximate to the half wave plate assembly 64 and a Faraday rotator element 71 is positioned on a side proximate to the half wave plate assembly 73. In addition, the refraction component and the Faraday rotator elements 70 and 71 all placed within the magnetic field generating component 67. In some implementations, the refraction component and the Faraday rotator elements 70 and 71 and the magnetic field generating component 67 are integrally packaged.

By changing the directions of the currents applied to the magnetic generating component 67, the switch state can be changed from one of the two optical fibers 78 emitted from dual fiber optical collimator 77 to the other optical fiber, thus changing the light path of optic signal propagation.

In some implementations, without consideration of the synchronization of light beams, a compensation plate may not be set up; or one side of the dual fiber optical collimator can be used as the optical input end and one side of a single fiber optical collimator is used as the optical output end.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A magneto-optic switch, comprising:
   a plurality of optical components positioned in order along a light path comprising:
   a single fiber optical collimator,
   a first birefringent optic crystal,
   a first half wave plate assembly comprising a first half wave plate,
   a second half wave plate assembly,
   only one polarization rotation assembly positioned between the first half wave plate assembly and the second half wave plate assembly,
   a second birefringent optic crystal, and
   a dual fiber optic collimator,
   wherein the polarization rotation assembly includes a first Faraday rotator, a second Faraday rotator, a Wollaston prism positioned between the first faraday rotator and the second faraday rotator, and only one magnetic field generating component,
   wherein the first Faraday rotator, second Faraday rotator, and Wollaston prism are positioned inside the magnetic field generating component and are integrally packaged, and
   wherein the polarization rotation assembly is configured to direct light signals to a first optical output port when a current is passed through the magnetic field generating component in a first direction and to direct light signals to a second optical output port when a current is passed through the magnetic field generating component in a second direction,
   wherein the single fiber optical collimator is a single core expanded fiber optical collimator and wherein a core expanded optical fiber is installed in the single core expanded fiber optical collimator, and
   the dual fiber optical collimator is a core expanded dual fiber optical collimator and wherein two core expanded optical fibers are installed in the dual core expanded fiber optical collimator.

2. The magneto-optic switch of claim 1, wherein the second half wave plate assembly has a second half wave plate, the second half wave plate being located on a light path of a light beam emitted from the first birefringent optic crystal.

3. The magneto-optic switch according to claim 1, wherein the second half wave plate assembly includes a compensation plate, the compensation plate being located on the light path of another light beam where the second half wave plate is located.

4. The magneto-optic switch of claim 1, wherein the first half wave plate assembly and the second half wave plate assembly, respectively, include two half wave plates, the two half wave plates in the same set of half wave plate assemblies are respectively located on the light paths of two light beams emitted from the first birefringent optic crystal.

5. A magneto-optic switch, comprising:
   a plurality of optical components positioned in order along a light path comprising:
   a single fiber optical collimator,
   a first birefringent optic crystal,
   a first half wave plate assembly comprising a first half wave plate,
   a second half wave plate assembly,
   only one polarization rotation assembly positioned between the first half wave plate assembly and the second half wave plate assembly,
   a second birefringent optic crystal, and
   a dual fiber optic collimator,
   wherein the polarization rotation assembly includes a first Faraday rotator, a second Faraday rotator, a refraction component comprising a first birefringent wedge and a second birefringent wedge, the refraction component positioned between the first Faraday rotator and the second Faraday rotator, and only one magnetic field generating component, wherein the first Faraday rotator, second Faraday rotator, and refraction component are positioned inside the magnetic field generating component and are integrally packaged, and wherein the polarization rotation assembly is configured to direct light signals to a first optical output port when a current is passed through the magnetic field generating component in a first direction and to direct light signals to a second optical output port when a current is passed through the magnetic field generating component in a second direction.

6. An optical system comprising:
   an input optical fiber;
   a first and a second output optical fiber; and
   a magneto-optic switch, comprising:
   a plurality of optical components positioned in order along a light path comprising:
   a single fiber optical collimator,
   a first birefringent optic crystal,
   a first half wave plate assembly comprising a first half wave plate,
   a second half wave plate assembly,
   only one polarization rotation assembly positioned between the first half wave plate assembly and the second half wave plate assembly,
   a second birefringent optic crystal, and
   a dual fiber optic collimator,
   wherein the polarization rotation assembly includes a first Faraday rotator, a second Faraday rotator, a Wollaston prism positioned between the first faraday rotator and the second faraday rotator, and only one magnetic field generating component, wherein the first Faraday rotator, second Faraday rotator, and Wollaston prism are positioned inside the magnetic field generating component and are integrally packaged, and wherein the polarization rotation assembly is configured to direct light signals to a first optical output port when a current is passed through the magnetic field generating component in a first direction and to direct light signals to a second optical output port when a current is passed through the magnetic field generating component in a second direction.

\* \* \* \* \*